US011861984B2

(12) United States Patent
Jones

(10) Patent No.: US 11,861,984 B2
(45) Date of Patent: Jan. 2, 2024

(54) ILLUMINATED OUTCOME DETERMINATION DEVICE

(71) Applicant: Mark Hamilton Jones and Sheryle Lynn Jones Family Trust dated November 7, 2013, Gardnerville, NV (US)

(72) Inventor: Mark H. Jones, Gardnerville, NV (US)

(73) Assignee: Mark Hamilton Jones and Sheryle Lynn Jones Family Trust dated November 7, 2013, Gardnerville, NV (US)

( * ) Notice: Subject to any disclaimer, the term of this patent is extended or adjusted under 35 U.S.C. 154(b) by 0 days.

(21) Appl. No.: 16/597,449

(22) Filed: Oct. 9, 2019

(65) Prior Publication Data

US 2021/0110660 A1 Apr. 15, 2021

(51) Int. Cl.
*G07F 17/32* (2006.01)

(52) U.S. Cl.
CPC ........ *G07F 17/3265* (2013.01); *G07F 17/322* (2013.01); *G07F 17/3213* (2013.01); *G07F 17/3293* (2013.01)

(58) Field of Classification Search
CPC ... A63B 71/00; A63F 5/04; A63F 9/24; A63F 1/12; G07F 17/32
See application file for complete search history.

(56) References Cited

U.S. PATENT DOCUMENTS 4,396,193 A * 8/1983 Reinhardt ........... G07F 17/3288 463/22
6,558,253 B1 * 5/2003 DeSimone .......... G07F 17/3244 463/16
2006/0022470 A1 * 2/2006 Johnson ................ F03B 13/142 290/54
2006/0068875 A1 * 3/2006 Cregan ............... G07F 17/3211 463/16
2006/0119036 A1 * 6/2006 Scozio ...................... A63F 5/04 273/142 R
2007/0120320 A1 * 5/2007 Miltenberger .......... A63F 5/007 273/143 R
2010/0120488 A1 * 5/2010 Savytskyy ............. G07F 17/32 273/142 E
2012/0122571 A1 * 5/2012 DeSimone .......... G07F 17/3211 463/31

(Continued)

*Primary Examiner* — Eugene L Kim
*Assistant Examiner* — Christopher Glenn
(74) *Attorney, Agent, or Firm* — Dickinson Wright PLLC

(57) ABSTRACT

An outcome determination device includes a controller a random generator configured to determine an outcome from a predetermined number of outcomes. The device includes a display device, which may in the form of a wheel, having a plurality of sectors. A plurality of illumination devices are associated with each of the sectors. The sectors correspond to the predetermined number of outcomes. The random number generator and controller determine an outcome for a game, with the outcome corresponding to one of the sectors. The controller illuminates the illumination device corresponding to the sector that corresponds to the determined outcome. The illumination devices may be illuminated before, during, and/or after determination of the outcome, and may be illuminated in sequence to produce a rotating effect or may be illuminated randomly.

17 Claims, 13 Drawing Sheets

(56) References Cited

U.S. PATENT DOCUMENTS

| | | | | |
|---|---|---|---|---|
| 2012/0200033 | A1* | 8/2012 | Owoc | A63F 5/046<br>273/142 JA |
| 2013/0307216 | A1* | 11/2013 | Jones | A63F 1/00<br>273/149 R |

* cited by examiner

ILLUMINATED OUTCOME DETERMINATION DEVICE

FIELD OF THE DISCLOSURE

This disclosure relates to an illuminated card shuffler for use with a casino card game as it relates to the selection of a card using a random number generator (RNG) to determine the outcome of the casino card game.

BACKGROUND OF THE DISCLOSURE

Games of chance, such as casino games like roulette and craps, are a popular activity throughout the world. These games provide patrons with an opportunity to place a wager on a particular outcome, with a payout corresponding to the relative likelihood of the result.

Roulette traditionally involves the use of a rotatable board that is disposed generally horizontally and includes a plurality of cavities designating a number and a color. Typically, the numbers range from 1-36, with a dedicated cavity for each number. Odd numbers may be assigned one color, and even numbers may be assigned another color, with red and black being the traditional colors used. The rotatable board may also include one or more cavities assigned to the numbers 0 and 00, which may be colored a third color, such as green.

To determine the outcome of the game, a game administrator, such as a casino worker, will spin the wheel about its central axis. While the wheel is spinning, a ball is introduced to the upper surface of the wheel. The ball will bounce and/or roll on the surface of the wheel, ultimately coming to rest in one of the dedicated cavities, determining the outcome of the game. In particular, the ball will come to rest in a cavity, identifying a number and color. With the number and color identified, the casino worker will identify which patrons correctly wagered on the outcome, and will pay out a prize amount to the patrons that correctly wagered on the outcome.

Craps involves the use of dice to determine the outcome of a game. Similar to roulette, patrons may place a wager on a particular outcome to be determined. The outcome of a craps game depends on the result of the roll of the dice. Traditionally, the dice are rolled by one of the patrons participating in the game, with a casino worker present to announce the result of the dice roll and pay out to the patrons that correctly wagered on the roll. Craps uses a pair of dice, such that there are 36 distinct outcomes that can arise from a pair of six-sided dice.

In both cases described above, as well as other games of chance, the outcome may be considered random to the extent that it is difficult to predict with any certainty what the outcome will be. However, there are factors that may come into play that can affect the game such that the outcome may not be as random as desired for a fair result. For example, a patron may conceivably use trick dice that result in a particular dice roll more often than expected. Similarly, a trick ball could be used in roulette. This is undesirable in game of chance, where the risks and payouts are based on an expected even distribution of results over an extended period of time.

In some cases, games of chance including the use of a ball or the use of dice are prohibited by law. Accordingly, players in a locality prohibiting such games of chance are unable to participate, requiring travel to another location if they wish to play such a game, or requiring the selection of a different game of chance that may be less desirable.

With roulette traditionally having 37 or 38 outcomes, and craps having 36 outcomes, one solution to these prohibitions is to use an alternative mechanism for determining the outcome from a particular trial/turn of the game. For example, a group of cards having the outcomes printed thereon may be used, with a patron or casino worker selecting one of the cards from the deck. In another alternative, a wheel having the outcomes printed thereon may be spun, with a paddle or indictor ultimately pointing to one of the outcomes when the wheel comes to rest. The wheel includes pegs at its perimeter, with the paddle or indicator allowing the wheel to rotate but also providing resistance to slow the wheel and ensure that the determination is clearly indicated between pegs when the wheel ultimately comes to rest. However, such a solution is noisy and distracting as the pegs impact against the paddle or indicator.

While the above solutions may be desirable when the traditional form of the game is prohibited by law, alternatives to the traditional forms of the game may also be desirable from an efficiency and fairness standpoint, such as reducing the potential for cheating or instances of faulty rolls or spins (such as when the ball rolls of the wheel in roulette or when the dice roll off the table in the craps).

In view of the above, improvements can be made to games of chance and the determination of the outcome of a game of chance.

SUMMARY

It is an aspect of the present disclosure to provide an illuminated outcome determination system that can produce an outcome for a game of chance without the use of dice or a ball.

It is a further aspect of the present disclosure to provide an illuminated outcome determination device that can produce an outcome for a game of chance with reduced noise.

It is a further aspect of the present disclosure to provide an illuminated outcome determination device that can be modified to provide outcomes for various types of games.

It is a further aspect of the present disclosure to provide an illuminated outcome determination device that can mimic the rotation of a game wheel.

It is a further aspect of the present disclosure to provide an illuminated outcome determination device that is attractive to players.

In accordance with these and other aspects, in one aspect a system for determining and revealing an outcome of a game of chance is provided, the system comprising: a controller; a random number generator (RNG) in communication with the controller, the RNG programmed and configured to produce an outcome randomly, wherein the outcome is one of a predetermined number of given outcomes; a display device including a plurality of sectors, wherein the sectors are configured to represent each of the predetermined number of given outcomes; a plurality of illumination devices associated with each of the plurality of sectors; wherein, the RNG produces the outcome randomly and the controller is configured to communicate with the plurality of illumination devices to illuminate one of the plurality of illumination devices that corresponds to a sector of the plurality of sectors that corresponds to the produced outcome.

In one aspect, the display device is a wheel.

In one aspect, the wheel is fixed to a base and does not rotate.

In one aspect, the wheel is fixed to a base and is rotatable relative to the base.

In one aspect, the plurality of illumination devices are disposed below the plurality of sectors.

In one aspect, the plurality of illumination devices are disposed adjacent the sectors.

In one aspect, the plurality of sectors have indicia printed thereon.

In one aspect, the indicia includes a number and a color.

In one aspect, the indicia includes a representation of two dice.

In one aspect, the sectors each include a removable indicia.

In one aspect, the controller is configured to illuminate multiple ones of the sectors in a sequence prior to producing the outcome.

In one aspect, the sequence is random.

In one aspect, the sequence illuminates adjacent sectors in order to produce a rotating effect.

In one aspect, the illumination devices are fixed to the wheel and rotate with the wheel.

In another aspect, a method of producing and displaying an outcome of a game of chance is provided, the method comprising: activating a random number generator; determining an outcome at the random number generator, wherein the outcome is one of a given number of predetermined outcomes; in response to determining the outcome, illuminating a sector on a display device corresponding to the outcome, wherein the display device includes a plurality of sectors corresponding to the given number of predetermined outcomes; and displaying the outcome by illuminating the corresponding sector.

In one aspect, the display device is a wheel.

In one aspect, the plurality of sectors are arranged circumferentially around a perimeter of the wheel.

In one aspect, the wheel is in a fixed rotational position relative to the base during the step of determining the outcome.

In one aspect, each of the sectors have a corresponding illumination device.

In one aspect, the method includes illuminating multiple illumination devices in a sequence prior to displaying the outcome.

In one aspect, the sequence includes illuminating a series of circumferentially adjacent illumination devices to produce a rotating effect.

In one aspect, the sequence includes illuminating the multiple illumination devices randomly.

In one aspect, the multiple illumination devices are illuminated in sequence over a predetermined period of time.

In one aspect, the multiple illumination devices are illuminated in sequence over a random period of time.

In one aspect, the sectors include an indicia.

In one aspect, the indicia is a modifiable display.

In one aspect, the indicia is removable and replaceable.

In one aspect, the sectors include cards affixed thereto.

In one aspect, the cards are held in slots.

BRIEF DESCRIPTION OF THE DRAWINGS

The drawings described herein are for illustrative purposes only of selected aspects and not all possible or anticipated implementations thereof, and are not intended to limit the scope of the present disclosure.

DETAILED DESCRIPTION OF THE DISCLOSURE

In the following description, details are set forth to provide an understanding of the present disclosure. In some instances, certain systems, structures and techniques have not been described or shown in detail in order not to obscure the disclosure.

In general, the present disclosure relates to an illuminated game outcome device or card shuffler for use with a game of chance or casino game as it relates to the selection of an outcome using a random number generator (RNG) to determine the outcome of the game, or a portion thereof.

Figure 1:
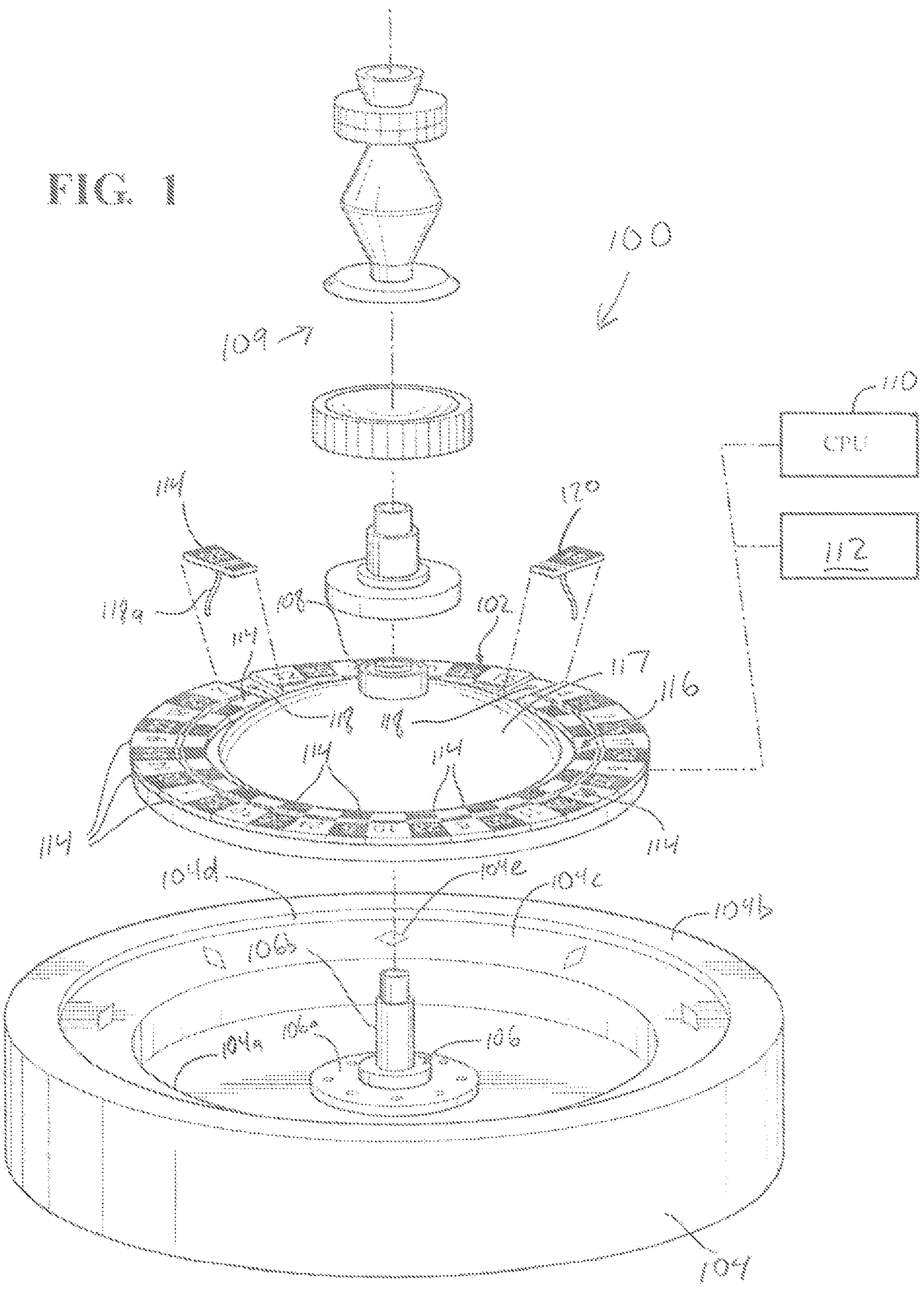
FIG. 1 is a perspective exploded view of an illuminated outcome determination device, according to aspects of the disclosure.

An example of the illuminated game outcome device according to aspects of the disclosure is shown in FIG. 1. The device may be used by an administrator/dealer of a game of chance or a casino game (referred to as a dealer herein for discussion purposes, although it will be appreciated that the person operating and/or administrating the game of chance may not be actively "dealing" cards or the like) and will be described in conjunction with one or more exemplary embodiments. However, the specific example embodiments disclosed are merely provided to describe the inventive concepts, features, aspects and objectives with sufficient clarity to permit those skilled in this art to understand and practice the disclosure.

The present disclosure provides for an illuminated card shuffler or illuminated game outcome determination device for use with casino games including, but not limited to, "Big Six" and "Money Wheel". These exemplary casino games are described in U.S. Pat. Nos. 8,505,919 and 8,695,981 and are hereby incorporated by reference in their entireties. It should be understood that other casino games may utilize the illuminated card shuffler or illuminated outcome determination device described herein.

The present disclosure provides for an illuminated game outcome determination device or an illuminated card shuffler including a display device or display surface. The display surface may include a plurality of sectors indicating various game outcomes and/or a plurality of card slots, wherein each card slot can receive a playing card, token, ticket, or other suitable gaming device. The display surface may also include a plurality of lights or illuminable portions, with at least one light or illuminable portion assigned to each sector or card slot. The lights can be operated to noiselessly simulate rotation or selection through sequential illumination for each outcome determination trial or shuffle of the illuminated card shuffler. Additionally, the lights can be operated to flash in a plurality of sequences to entice players when an outcome determination trial or shuffle for a game is not in progress.

The present disclosure also provides for a casino game where the outcome determination mechanism, or the shuffler (card selection), is a random number generator (RNG). The RNG is connected to a controller operated by a dealer. The RNG can be included in a computer as software (an application) or the RNG can be a stand-alone device including a processor and memory, for example. The RNG is also connected to the plurality of lights. The dealer operates the outcome determination device or illuminated card shuffler using the controller to cause the RNG to randomly generate a number assigned to a particular sector or card of the sectors/cards included in the casino game. At or about the same time, the lights of the outcome determination device or illuminated card shuffler may begin to sequentially illuminate, simulating rotation (or randomly illuminate) for a period of time to allow for player suspense to build. According to an aspect, the display face remains stationary, i.e. does not move or rotate. Once a sector/number and its respective card is chosen by the RNG, the simulated rotation through sequential illumination stops and only the light or lights assigned to the chosen sector/card remain illuminated, denoting the winning sector/card. In other words, the non-chosen card lights will be turned off.

The noiseless representation of rotational movement (or other noiseless representation of outcome selection) of the outcome determination device or illuminated card shuffler is desirable for situations where the noise of a traditional rotational casino card game may be undesirable, such as a high-end gaming environment. The winning sector/card can be selected using the RNG and not a flapper-peg configuration, which can generate an undesirable level of noise in a casino gaming environment. The outcome determination device or illuminated card shuffler can be configured to operate at a desired pace, which may be adjustable. In other words, the length of time for the outcome determination trial or illuminated card shuffler operation (a cycle) can be adjusted to increase player suspense (longer times for chosen sector/card to be illuminated) or to improve cycle time (shorter times to increase game play), or to be unpredictable by observers to increase suspense and entertainment value.

Once the chosen sector/card has been illuminated by the outcome determination device or illuminated card shuffler, the dealer announces the winning sector, which may also be directly observable, or the dealer removes the card from its card slot if the card is obscured, displays it to the players, and settles all wagers. In the case of a card selection, the dealer then returns the chosen card to its slot and a new illumination sequence begins. In the case of illuminating a particular sector, a new illumination sequence may begin without physically replacing the card or the like. The illumination sequence prior to conducting a trial of the outcome determination device or illuminated card shuffler can be coordinated flashing or random flashing to draw attention to the casino card game and to drive excitement and wagering on the upcoming trial of the game.

Referring now to FIG. 1, a non-limiting example of an outcome determination system 100 for a game of chance, such as a casino game, is shown in an exploded view. The exploded view includes components similar to a traditional rotational wheel system, like a roulette wheel, for illustrative purposes, although it will be appreciated that some of the illustrated components may be excluded as the system may not require rotation or structure to support a traditional roulette system. The system includes a wheel 102 that may be mounted to a base 104. The wheel 102 may be mounted to the base 104 in a rotatably fixed position in one aspect. In another aspect, the wheel 102 may be mounted to the base 104 and configured to rotate relative to the base 104. In the case where the wheel 102 is rotatably mounted to the base 104, the base 104 may include a post 106 and the wheel 102 may include a collar 108 configured to receive the post 106 and allow for rotation of the wheel 102 relative to the base 104. A topper assembly 109 may be disposed over the collar 108 and post 106. The system further includes a CPU 110 and a random number generator (RNG) 112 that are operatively coupled to the wheel 102, the operation of which will be described in further detail below.

As shown, the wheel 102 includes a plurality of sectors 114. The sectors 114 are shown in FIG. 1 as including a distinct indicia related to the outcome of a game. For example, the sectors 114 include both a number and a color. As shown, the sectors 114 are in the form of a portion of a top surface 116 of the wheel 102, such that the sectors 114 combine to produce a generally continuous surface of the wheel 102, resembling a traditional roulette wheel. The top surface 116 may include projections that extend upwardly therefrom to delimit each individual sector 114, similar to a traditional roulette wheel in which a ball is received in a cavity corresponding to one of the numbers/colors. However, the top surface 116 may also be generally smooth without a projecting delimiter, because there is no ball to be physically received.

To resemble a traditional roulette wheel, the wheel 102 may further include a dome portion 117. The base 104 may include structure for supporting and receiving the wheel 102 and for resembling a traditional roulette wheel. For example, the base 104 may include an annular recess 104*a* for receiving the wheel 102. The post 106 may include a base portion 106*a* and a shaft portion 106*b*. The base 104 may include an outer ring portion 104*b*, with a tapered ring portion 104*c* adjacent the outer ring portion 104*b*, with a lip portion 104*d* extending therebetween. The tapered ring portion 104*c* may include markings 104*e*.

The sectors 114 are each individually provided with an illumination device 118, such as an LED bulb, fiber-based illumination device, or the like, configured to illuminate one or more of the individual sectors 114 depending on the particular function of the game, which will be described in further detail below. Each individual sector 114 may be independently illuminable relative to the other sectors 114. The illumination device 118 may be disposed below the sector 114, such that it is hidden from view when the system 100 is assembled. The illumination device 118 may alternatively be disposed adjacent the sectors 114, such as radially outboard or radially inboard of the sectors 118. In another aspect, the illumination device 118 may project through a visible surface of the sectors 114. Each individual sector 114 may have its own dedicated illumination device to allow each sector 114 to be independently illuminable. In an alternative arrangement, illumination may be provided by a single source or group of light sources, with opaque gate-type devices that block light from certain sectors 114 and allow light to emit at other sectors 114, thereby allowing for individual and independent illumination of one or more selected sectors 114. For the purposes of discussion, individual illumination devices 118 corresponding to each individual sector 114 will be referenced herein.

To permit the individual sectors 114 to be illuminated individually, the sectors 114 may be made from a plastic or other transparent or translucent material, such as glass. The sectors 114 may be tinted or shaded with a desired color to allow for distinguishing the different colors of the various sectors, such as red/black/green. In another aspect, the sectors may be substantially opaque and colored the desired color, such as red/black/green, with a window portion being transparent or translucent to allow the light to shine through only a portion of the sector 114. In one aspect, the number displayed on the sector 114 may be the transparent or translucent portion. The sectors 114 may include light refracting features such that illumination of a portion of the sector 114 will transmit light to the entire sector 114.

In one aspect, the illumination device 118 may be embedded in the sector 114, with a wire 118*a* extending through the wheel 102 and attached to the sector 114. The wire 118*a*, in one aspect, may project through a hole in the wheel 102 disposed at a location similar to the illumination devices 118 disposed below the sectors 114.

It will be appreciated that various types of illumination patterns may be used for each individual sector 114 in accordance with the desire of the user. For example, the sectors 114 may indicate different symbols other than traditional roulette numbers. Additionally, the color of the light that is emitted may be one of various colors, such as white light, red light, green light, blue light, or the like.

Figure 2:
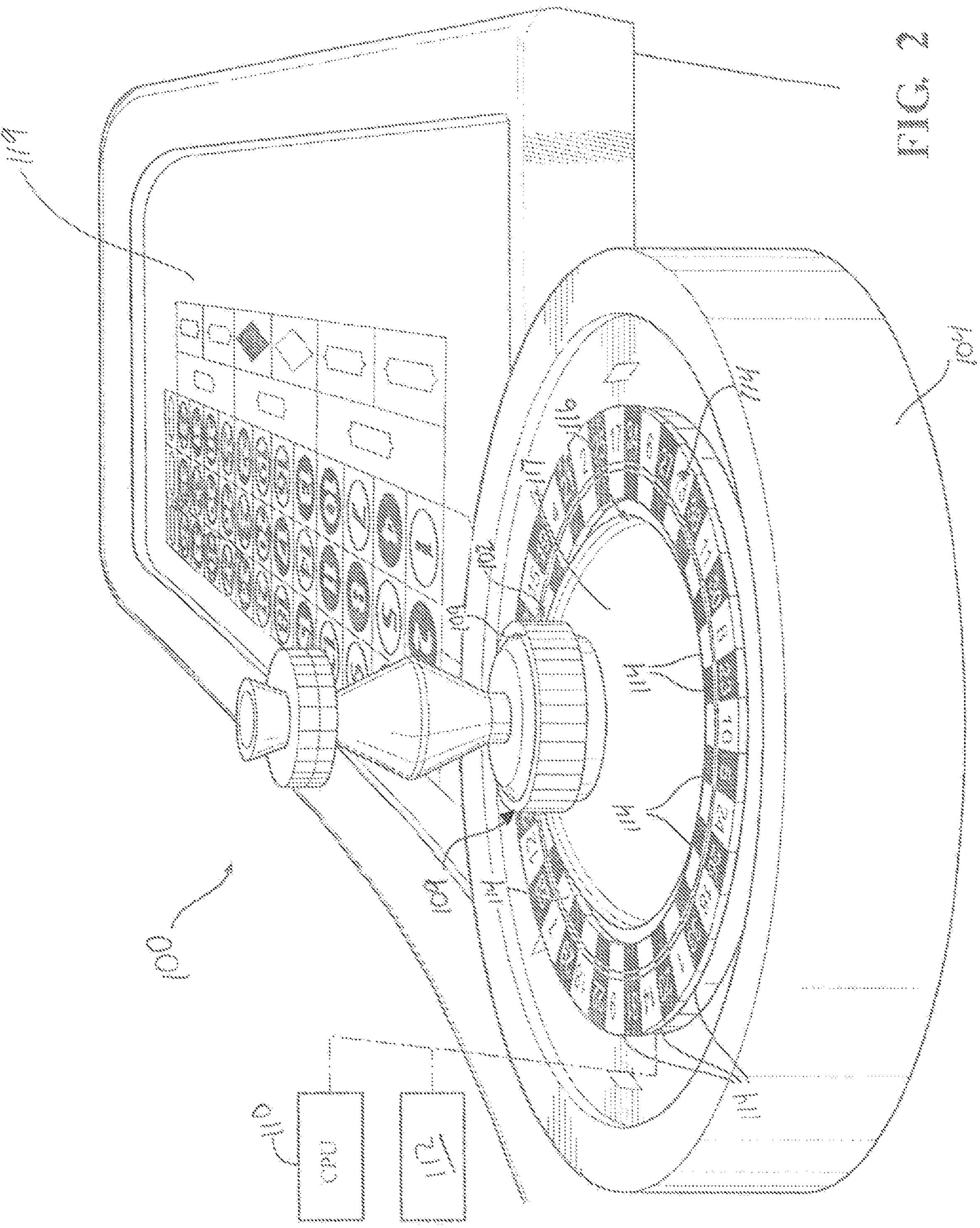
FIG. 2 is a perspective view of the illuminated outcome determination device arranged adjacent a gaming table according to aspects of the present disclosure.

FIG. 2 illustrates one aspect of the system 100, in which the wheel 102 is oriented horizontally and adjacent a wagering surface or table 119, similar to a traditional roulette wheel that relies on gravity to determine the outcome of the trial, with the ball settling into one of the cavities defined by the wheel. However, with the present system 100 that operates without a ball, the wheel 102 may also be oriented in a non-horizontal fashion, such as vertical, or inclined at an oblique angle relative to horizontal. In one aspect, the wheel 102 could be oriented horizontally, but flipped over, such as being disposed on a ceiling. It will be appreciated that due to the outcome of the trial being determined by the RNG 112 and not requiring physical movement, the system 100 and the wheel 102 thereof may have a wide variety of orientations and may be disposed at various locations within the casino, and not necessary immediately adjacent the dealer or the wagering surface 119.

The system 100 determines the outcome of the trial based on the RNG 112, which determines a number and/or location of a sector 114 to be selected and illuminated. In one aspect, the sectors 114 may be removable, if required by gaming regulations or the needs of the user. In another aspect, the sectors 114 may be permanent with fixed indicia. The RNG 112 may be configured to generate a number corresponding to a specific gaming outcome, or it may be configured to generate a generic sector location, such that both fixed sectors 114 and variable sectors 114 may be accommodated. Ultimately, the information printed on the sector 114 that is illuminated after the outcome is determined is the information that determines the winning wager(s).

The CPU or controller 110 generates a signal to illuminate the selected sector 114. Accordingly, there is no introduction of a ball or dice into the game of chance, and the wheel 102 does not need to rotate to determine the outcome of the game. However, if desired, the wheel 102 may rotate for aesthetic reasons.

As described above, the wheel 102 does not need to rotate, because the outcome of the game is determined by the RNG 112 and not the physical location of a ball relative to a wheel. However, the wheel 102 may be animated by the illumination devices 118 being illuminated in a pattern as controlled by the controller 110. For example, the controller 110 may illuminate sequentially adjacent sectors 114 by illuminating the corresponding sequentially adjacent illumination devices 118 assigned to each sector 114 in order around the wheel 102. Such sequential illumination can provide the appearance of a pattern resembling rotation.

Alternatively, the sectors 114 may be illuminated in a non-sequentially adjacent nature, such that sectors 114 may be illuminated in various locations around the wheel 102, thereby providing an effectively random illumination pattern. However, this illumination pattern is not necessarily "random." Rather, the illumination pattern may be predetermined and simply appear random to the untrained eye, with the illumination "bouncing" around and across the wheel from one sector to another.

Alternatively, the sectors 114 may be illuminated in a truly random pattern as determined by the RNG 112. In this approach, the illumination order of the sectors 114 is not predetermined, with various sectors 114 around the wheel 102 being illuminated randomly. In this aspect, the illumination pattern may "bounce" around and across the wheel randomly, or sequential sectors 114 may be illuminated from time to time.

In each of the above illumination patterns of the sectors 114, such illumination may occur both before and after the determination of the winning sector 114. In the case where the illumination pattern is determined after determining the winning sector 114, the pattern may be selected to start slowing down as the illumination pattern "approaches" the determined winning sector 114. Similarly, the illumination pattern may speed up in the lead up to the display of the winning of sector 114. Alternatively, the illumination may occur only before the determination of the winning sector 114. Alternatively, the illumination may occur only after the determination of the winning sector 114. In one aspect, the illumination pattern may begin with multiple sectors 114 being illuminated, and over time non-winning sectors 114 become non-illuminated, leaving the winning sector 114 as the final illuminated sector.

The illumination pattern of the wheel 102 may occur for a predetermined period of time prior to revealing the winning sector 114 after the winning sector 114 is determined. For example, upon determination of the winning sector 114 by the RNG 112, the wheel 102 may be illuminated in one of the various illumination sequences for 5 seconds and then the winning sector 114 is illuminated at the end of that period to reveal the winning sector 114.

Alternatively, the illumination pattern of the wheel 102 may occur over a varying time in order to build suspense. For example, in one trial, the period of time prior to the winning sector 114 being revealed may be 5 seconds, with the next period being 10 seconds, and the next period being 2 seconds, etc. The varying time periods may be predetermined such that appear "random" or the varying time periods may be determined randomly for each trial.

As described above, the wheel 102 need not rotate. However, the wheel 102 may also be rotatable relative to the fixed base 104. The illumination devices 118 may be fixed to the wheel 102 and in communication with the controller 110, such that the illumination devices 118 are still controllable even when they rotate along with the wheel 102. The rotation of the wheel 102 while still allowing for illumination patterns to identify the winning sector 114 adds additional flexibility to the system, while providing additional entertainment aspects to the users.

While the wheel 102 has been described above as having various indicia printed thereon, an in particular on the sectors 114, the wheel 102 may also be configured to retain cards 120 at some or all of the sectors 114. In this aspect, the system 100 may operate as an illuminated card shuffler. The cards 120 may be traditional gaming cards in style and shape, namely a flexible rectangle, or the cards 120 may be rigid and in non-standard shape. It will be appreciated that the cards 120 may have other styles and shapes, while retaining card-type functionality, such as having various printed indicia that alone or in combination provide a gaming outcome. For purposes of discussion, the term "shuffler" refers to the selection of a card, and not the intermingling of cards that traditionally occurs prior to cards being dealt as in poker or blackjack.

The illuminated card shuffler will operate to illuminate a selected sector 114, which will determine the outcome of the game based on the indicia printed on the card 120, which may or may not be apparent when the winning sector 114 is determined and indicated. The cards 120 may be placed on the wheel 102 and secured to the wheel 102, and may be removable and replaced with different cards to enable different games on the same device 100. The face of the cards 120 may be hidden from view, and may be revealed upon being selected, or the face of the cards 120 may be displayed and may operate as an interchangeable fixed indicia.

In one aspect, the cards 120 may have indicia printed thereon that match a traditional roulette outcome. In another aspect, the cards 120 may have indicia printed thereon that match a traditional two-dice outcome. In another aspect, the cards may have other gaming outcomes printed thereon, such as the cards used in a traditional 52-card deck used in poker and blackjack.

Because the selection of a particular sector is determined randomly, the actual placement of the cards 120 on the various sectors 114 can be made randomly or without a specific placement routine. The odds of any one sector 114 being selected remains the same, so it does not matter if, for example, the card with the number "1" is placed in any particular sector for the odds of the "1" being the outcome to remain the same.

Another example of an illuminated card shuffler 10 is disclosed below, in which cards 18 are disposed in card slots 16 of the illuminated card shuffler. Various elements of the functionality and structure of the system 100 may be applied to the illuminated cars shuffler 10 described below.

Figure 3:
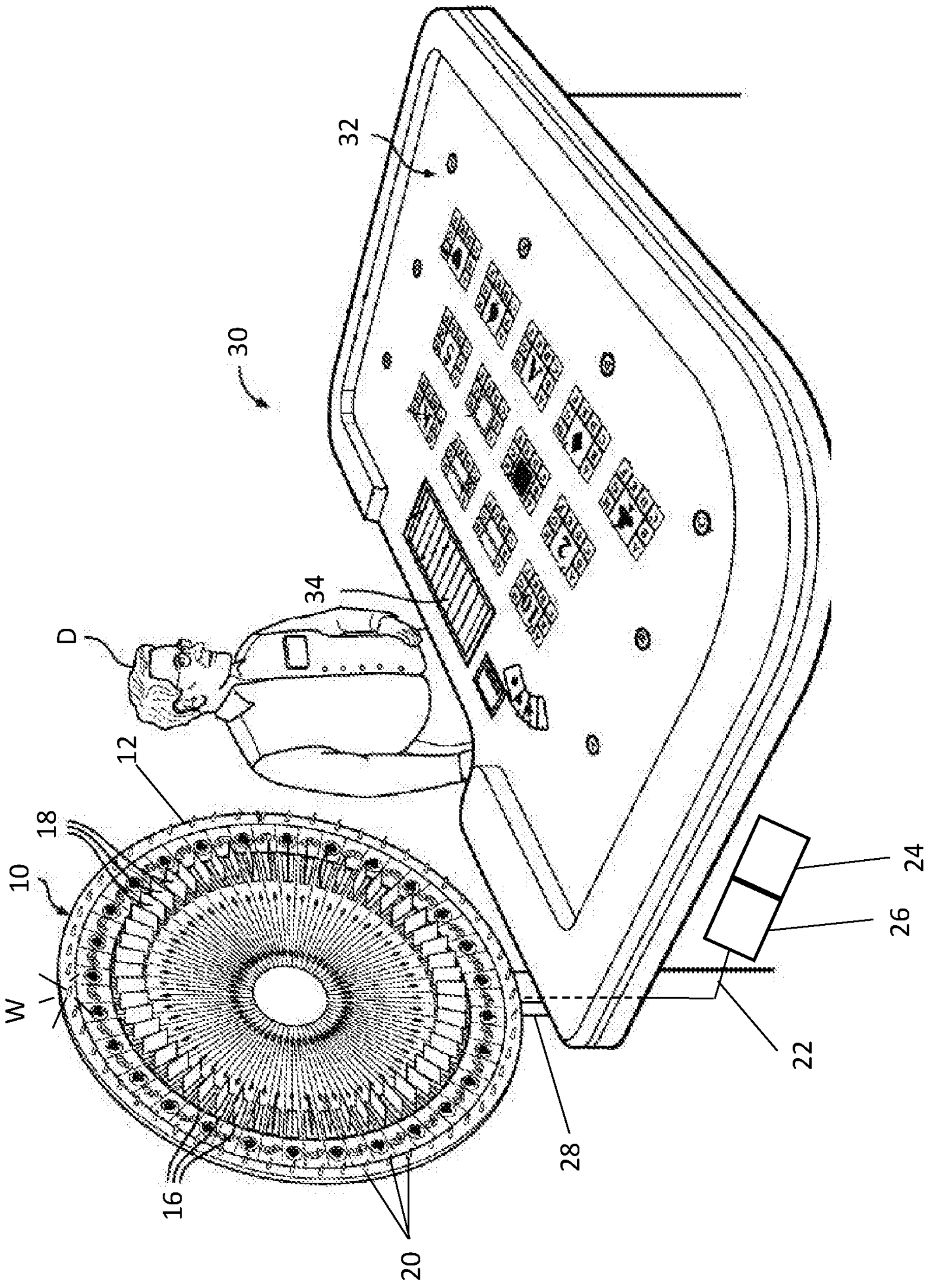
FIG. 3 is a perspective view of an illuminated outcome determination device in the form of an illuminated card shuffler with a dealer and a gaming table, according to aspects of the disclosure.

With reference to FIG. 3, one example of an illuminated card shuffler 10 is shown and includes a front face 12, a back face 14 disposed behind the front face 12, a plurality of card slots 16 to hold a plurality of cards 18. A plurality of lights 20 are disposed about the perimeter of the front face 12. The lights 20 can be configured as posts or pegs containing light-emitting diodes (LEDs), for example. In other embodiments, the lights 20 can be configured as light bulbs extending from the front face 12 or be contained within the front face 12, such as in recessed compartments covered with lenses. According to an aspect, the LEDs can be disposed in a variety of different places, including a portion of each of the trays.

In the non-limiting example of the illuminated card shuffler 10 shown in FIG. 3, the illuminated card shuffler 10 includes an electrical connection 22 and a random number generator (RNG) 24. The illuminated card shuffler 10, the electrical connection 22 and the RNG 24 are also electrically connected to a controller 26 that can be operated by a dealer D or remotely from another location (such as elsewhere within a gaming casino). A column 28 supports and connects the illuminated card shuffler 10 vertically above a physical table 30 including a playing surface 32 and a chip tray 34.

According to an aspect of the disclosure, during play using the illuminated card shuffler 10 as shown in FIG. 3, the dealer D requests wagers (bets) from one or more players (not shown) disposed around the physical table 30. The players place their wagers on the playing surface 32 corresponding to their location and the possible outcomes of the particular game using the illuminated card shuffler 10. At the same time, the RNG 24 or the controller 26 may be operating the lights 20 in a plurality of illumination modes. These modes may include random flashing, sequential flashing, segmented flashing, or flashing to another predetermined pattern. The illumination modes may be stored electronically (such as in memory) contained within the RNG 24 or the controller 26. The dealer D may use the controller 26 to operate the lights 20 in the illumination modes. One objective of the illumination modes of the illuminated card shuffler 10 is to entice players to approach and play the casino card game. Another objective is to cause excitement in the players already present at the physical table 30 to place their wagers on another game of the casino card game. It is important to note that the illumination modes of the lights 20 operate noiselessly. In contrast, other casino card games with a card shuffler including pegs and one or more flappers may entice players by having the dealer D rotate (i.e., spin) the card shuffler, causing the flapper(s) to make noise due to the flapper(s) striking the pegs during rotation of the card shuffler. This flapper noise may be undesirable in some casino gaming environments, such as high-end casino gaming environments.

Once the player(s) have places wagers on the playing surface 32 of the physical 30, the dealer D operates the RNG 24 using the controller 26. The RNG 24 generates a random number representing a card contained in one (or more) of the card slots 16 of the illuminated card shuffler 10. At the same time, the lights 20 may begin a different sequence of illumination from one of the illumination modes described above (or maintain one of the illumination modes). After a predetermined of time has elapsed, or by command of the dealer D using the controller 26, the RNG 24 or the controller 26 deluminates (turns off) all of the lights 20 except for the light 20 that corresponds to the random number representing the card 18 or the location of the card 18 as chosen by the RNG 24. The sole illuminated light 20 indicates the card 18 or the location of the card 18 that is the winning card of the casino card game.

In the case of the card 18 being hidden from view, after the RNG 24 and the controller of the illuminated card shuffler 10 selects and only illuminates the winning card W location on the illuminated card shuffler 10, the dealer D may remove the winning card W from its card slot 16 and show it to the player(s) of the casino card game situated around the physical table 30 (or other location where wagers were placed). Additionally and alternatively, the winning card W may be automatically exposed and/or retracted (e.g., mechanically, electrically) from the winning card slot 16 by the illuminated card shuffler 10. The dealer D may then settle any wagers relating to the winning card W (pay chips to winning players or retrieve chips from losing players). The dealer D may then re-insert the winning card W into the respective card slot 16 on the illuminated card shuffler 10, completing a game of the casino card game using the illuminated card shuffler 10. The dealer D may then reset the casino card game using the RNG 24 or the controller 26, turning off the light 20 of the location of the winning card W. The illumination modes of the lights 20 may then noiselessly re-commence while players decide how to wager on the next game.

According to an aspect of the disclosure, the card slots 16 and the cards 18 of the illuminated card shuffler 10 may be configured electronically, such as that each card slot 16 and card 18 may be replaced by an electronic display (e.g., a LED video display). As a result, the card slots 16 and cards 18 may be selectively visible such as during a casino card game while at other times other images may be displayed in the electronic displays (e.g., casino name, messages to players, other images). Thus, when the RNG selects the winning card W, the electronic display in the winning card W may be configured to display (draw attention to by illumination) the winning card W. Simultaneously or near so, the other displays may go dark or display other images such as logos of the casino or the casino game being played (roulette, craps). By this configuration, the type of game played on the illuminated card shuffler 10 may be changed very quickly between, for example, a roulette and a card game.

Figure 4:
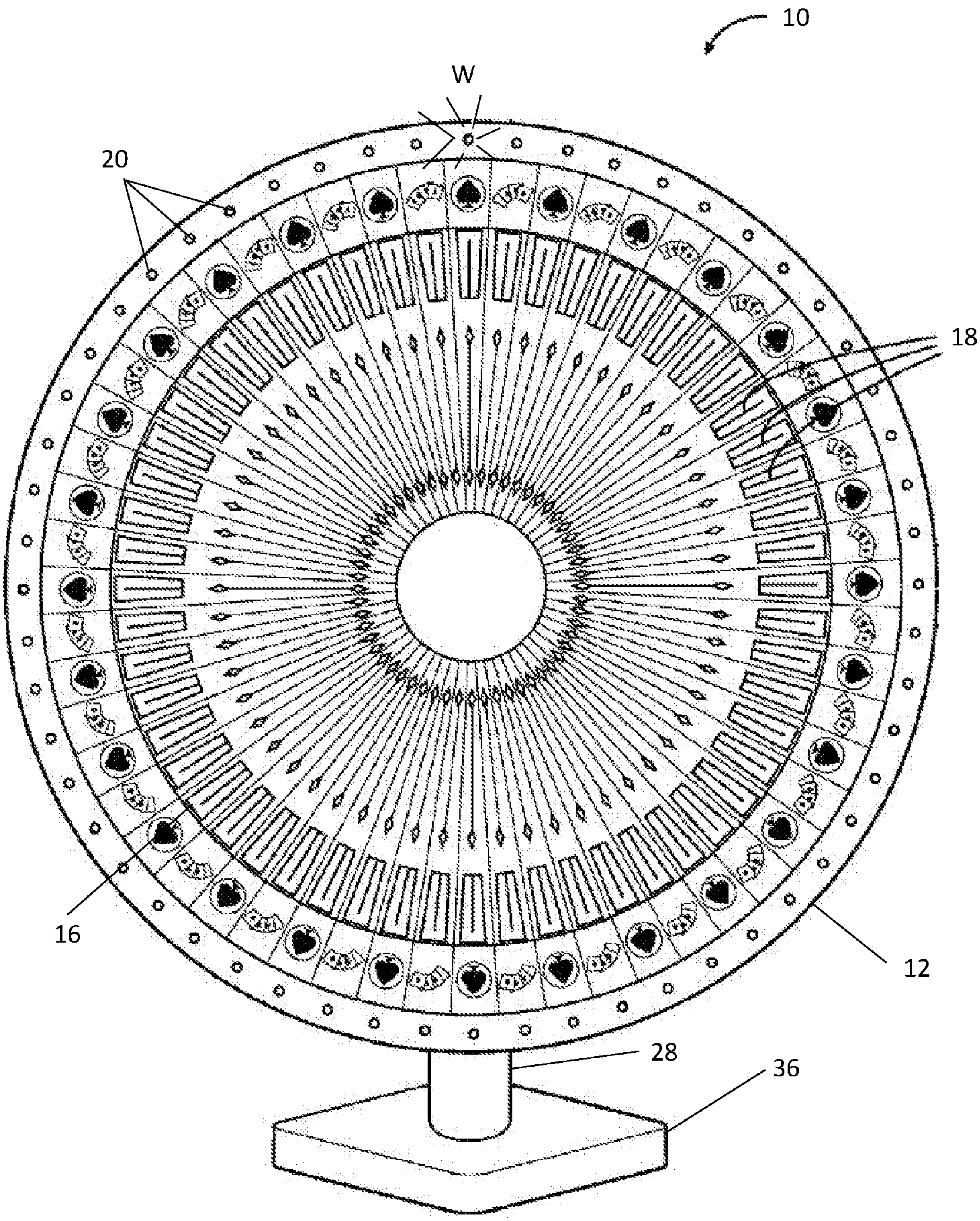
FIG. 4 is a front view of the outcome determination device, according to aspects of the disclosure.
Figure 5:
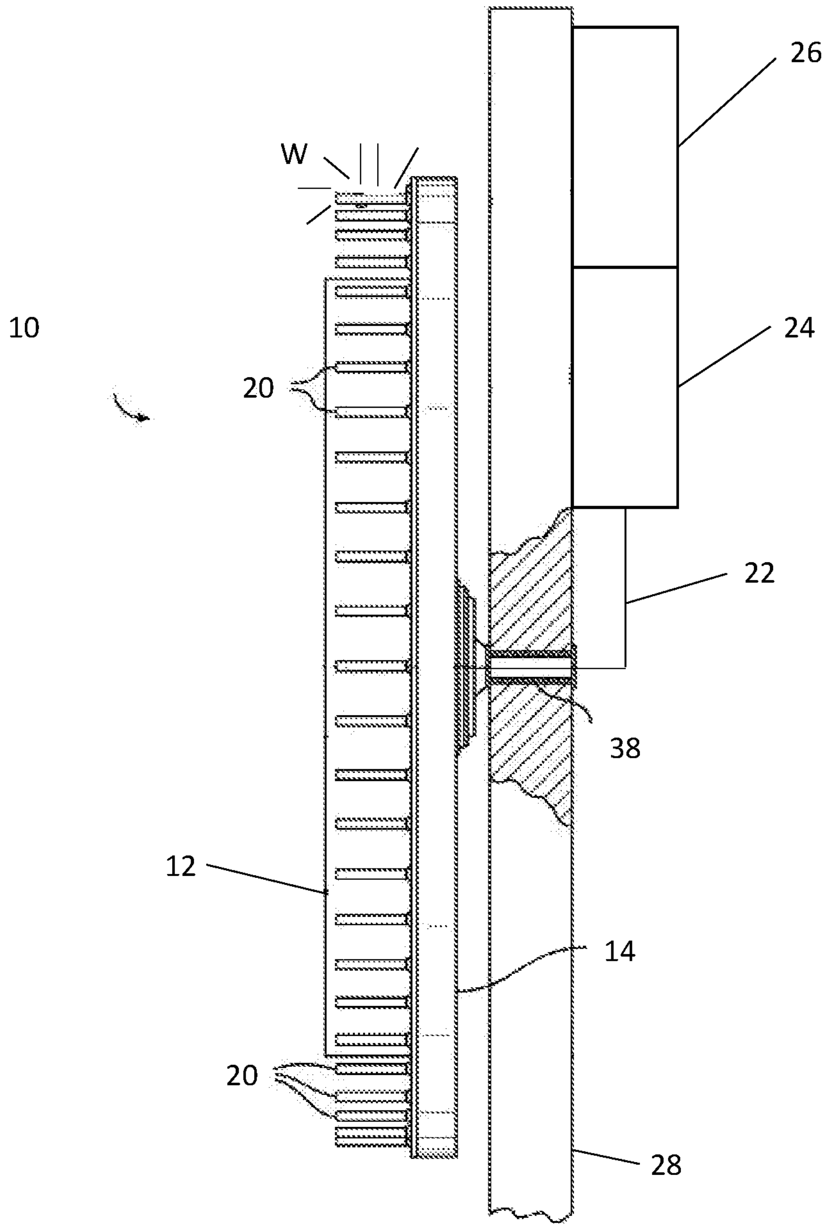
FIG. 5 is a side view of the illuminated outcome determination device, according to aspects of the disclosure.
Figure 6A:
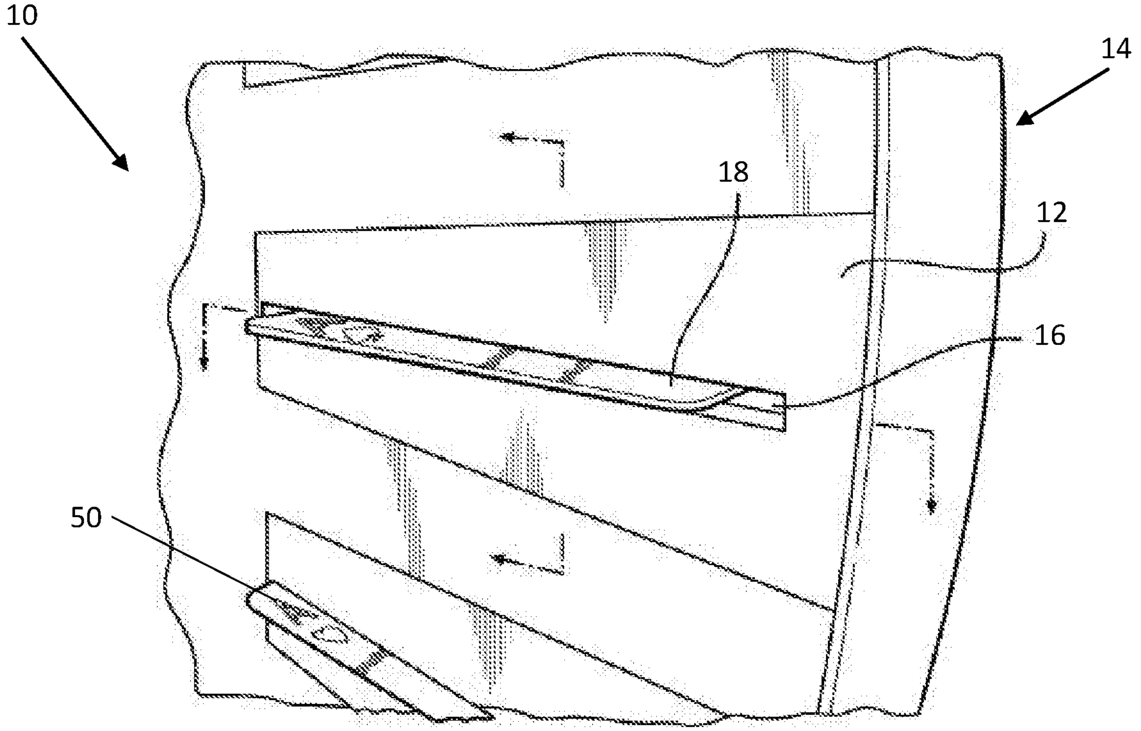
FIG. 6A is a partial close-up view of the illuminated outcome determination device, according to aspects of the disclosure.
Figure 6B:
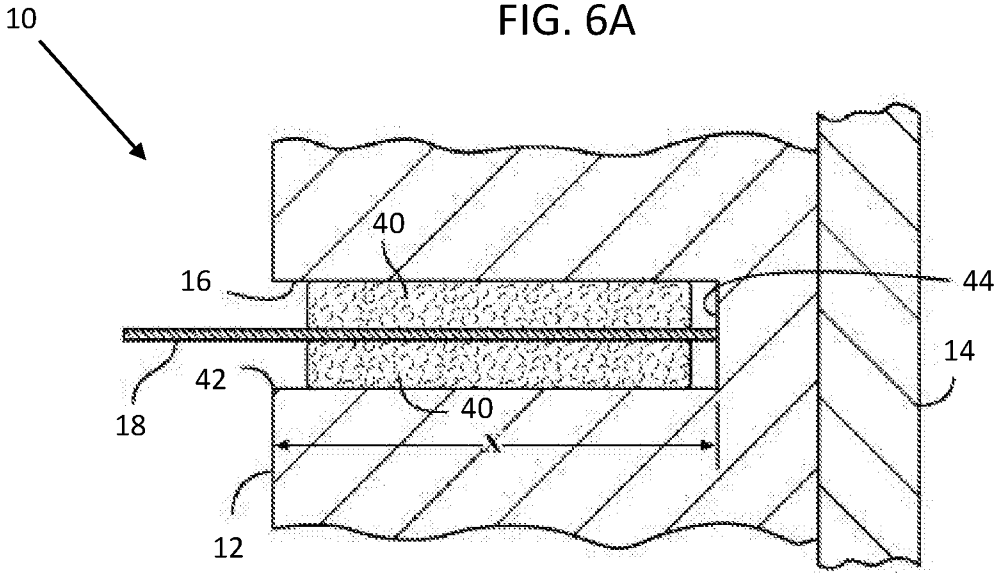
FIG. 6B is a partial, close-up sectional view of the illuminated outcome determination device, according to aspects of the disclosure.
Figure 7A:
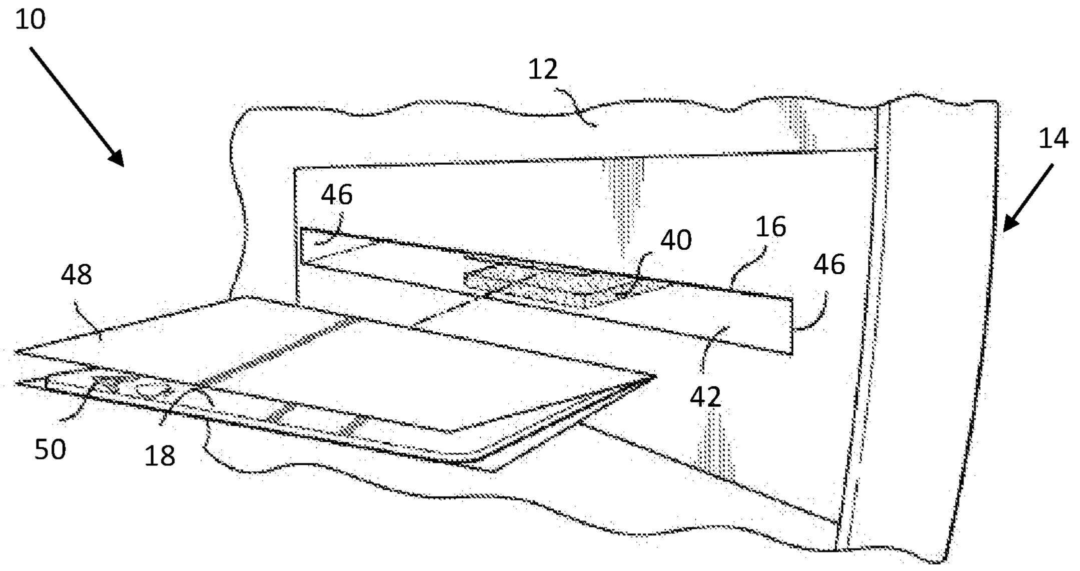
FIG. 7A is a partial perspective view of the illuminated outcome determination device showing a card removed from a card slot with an optional folder used to hide the indicia when the card is placed in the slot, according to aspects of the disclosure.
Figure 7B:
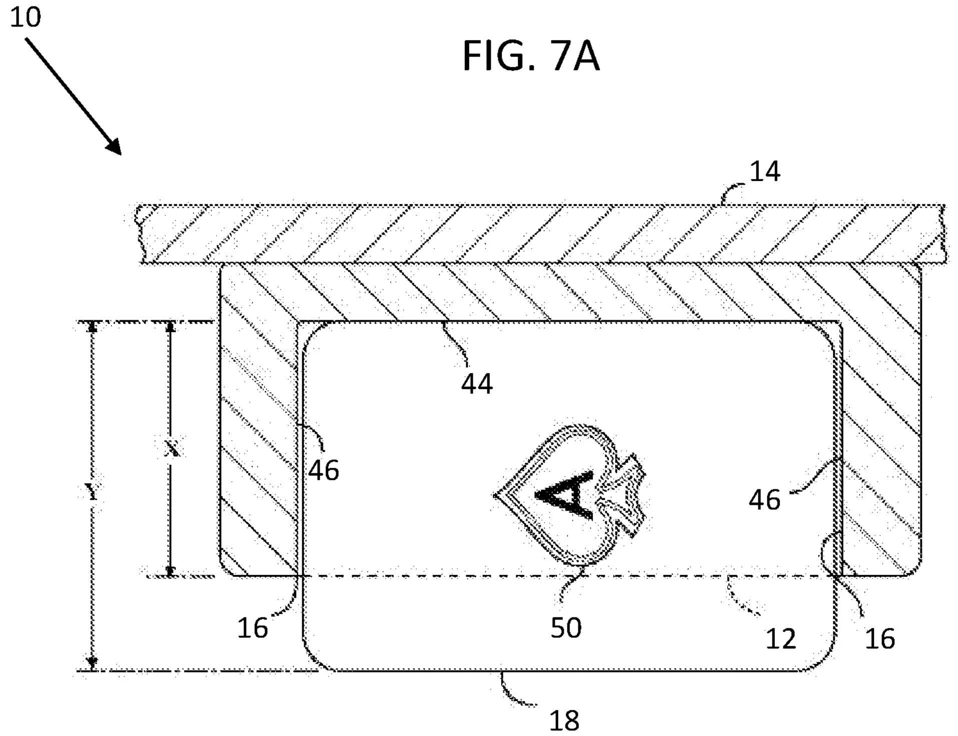
FIG. 7B is a cross-sectional view showing an optional card layout whereby the indicia is arranged so as to be hidden when the card is placed fully within the slot, according to aspects of the disclosure.
Figure 8A:
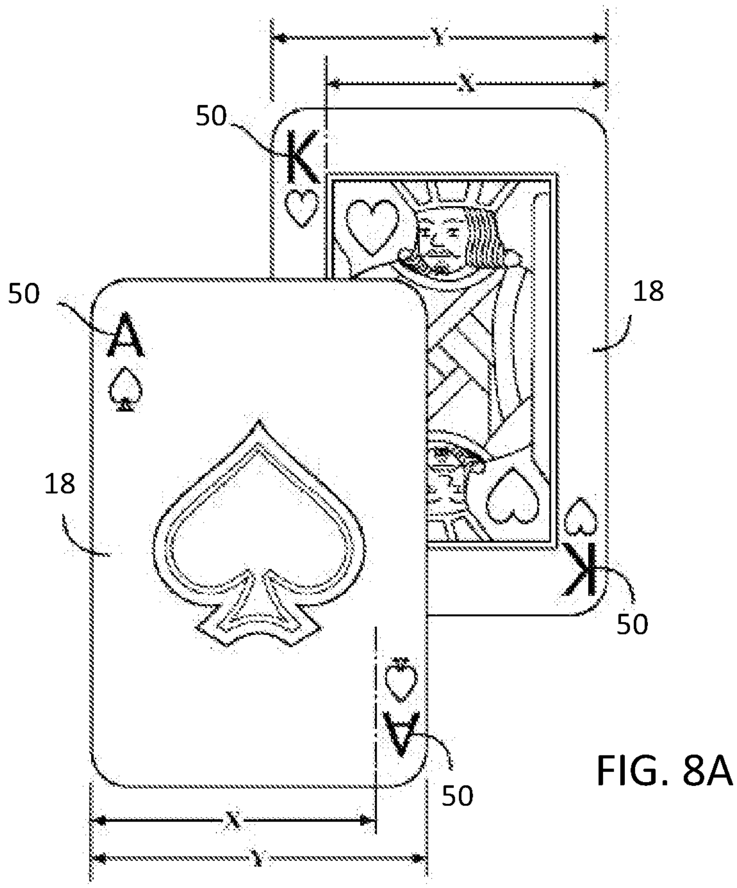
FIG. 8A is a simplified view of two playing cards together with dimensional references correlating dimensions of the playing cards to dimensions of the card slot of the illuminated outcome determination device, according to aspects of the disclosure.
Figure 8B:
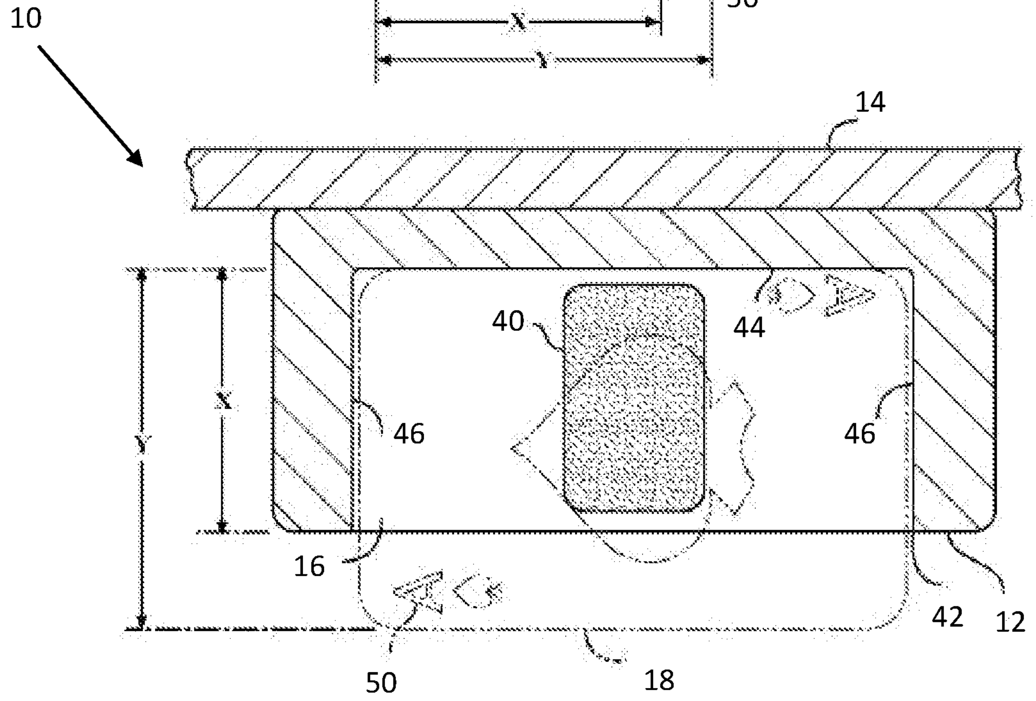
FIG. 8B is a cross-sectional view of a card slot of the illuminated outcome determination device with the card shown therein in phantom.

Referring now to FIGS. 4-5, the illuminated card shuffler 10 is shown free-standing. The illuminated card shuffler 10 includes the front face 12, the back face 14, the plurality of card slots 16 to hold the plurality of cards 18. The front face 12 includes the plurality of lights 20 disposed about the perimeter of the front face 12 such that at least one of the plurality of lights 20 is disposed to represent a particular card slot 16 holding a particular card 18. It should be understood that while the illuminated card shuffler 10 is shown as circular, the illuminated card shuffler 10 may be represented in a plurality of other shapes and sizes. This disclosure contemplates illuminated card shufflers accordingly and the illustrative examples of illuminated card shufflers described herein are only exemplary and not limiting.

The lights 20 of the illuminated card shuffler 10 are connected via an electrical connection 22 to a RNG 24 and a controller 26. The electrical connection 22 may be configured to pass through attachment pin 38 that secures the illuminated card shuffler 10 to a support column 28. The support column 28 is also be connected to a support base 36 such that the illuminated card shuffler 10 is vertically free-standing.

Referring now to FIGS. 6A-8B, portions of the illuminated card shuffler 10 is shown including the front face 12, the back face 14, card slots 16, and the cards 18 disposed at least partially within the card slots 16.

The card slots 16 may include one or more friction elements 40 that may be configured to secure cards 18 at least partially within the card slots 16. It should be understood that the card slots 16 may be configured to receive some or all of the cards 18 such that it may be difficult or not possible for the cards 18 to be visible (other than their edges) while within card slots 16.

The total number of card slots 16 may include a predetermined number which may vary depending on the type of game being played. Alternatively, some of the card slots 16 may be left empty or replaced with other items or cards, such a prize cards. For example, if the illuminated card shuffler 10 is used to play a game similar to or according to the traditional rules of roulette, the predetermined number of card slots 16 may be thirty-seven (37) if playing European-style roulette with only one zero (0). However, the predetermined number may be thirty-eight (38) if playing American-style roulette that includes both zero (0) and double zero (00). If playing a game similar to the game of craps, the predetermined number of card slots 16 may be thirty-six (36) representing the thirty-six (36) possible outcomes of two (2) rolled dice. Naturally, other games may require a different number of predetermined card slots 16. Each card slot 16 extends from an open end 42 through the front face 12 to a bottom 44. The distance between the open end 42 and the bottom 44 defines a slot depth X as shown in FIG. 4B. The plurality of card slots 16 are disposed equally about the perimeter of the front face 12 in this exemplary embodiment.

The friction element 40 is disposed in each of the card slots 16. The friction element 40 may include a pair of opposing textile patches adhered (glued) to either face of the card slot 16. The friction element 40 may be formed of a material having a deep surface texture formed of piles, loops, strands, or other relatively flexible bristles which reach into and may even contact the bristles of the opposing friction element 40. It is contemplated that the friction element 40 may be configured as a Velcro® hook-and-loop fastener system, spring clips, magnets covers, and/or envelopes, for example and without limitation.

According to an aspect of the disclosure, the friction elements 40 may include (or work in conjunction with) a mechanical or electrical device to selectively raise and/or lower the cards 18, such as the winning card W or to replace or otherwise change the cards by the dealer D.

The illuminated card shuffler 10 may include a plurality of cards 18 or other suitable gaming devices (tokens, tickets, etc.). The cards 18 may be standard playing cards such as used for the games of blackjack and poker, or may be manufactured to custom specifications for the illuminated card shuffler 10. The total number of cards 18 may be equal to the predetermined number of active card slots 16. For example, a game could be played wherein one or more cards 18 (or suits of cards 18) are eliminated based on the rules of the game. For example, if there are no wagers on a particular suit of cards 18, those card slots 16 and their respective lights 20 may be configured to be inactive/deluminated. As another example, if a game similar to craps is being played and the predetermined number of card slots 16 is thirty-six (36), then thirty-six (36) cards 18 will be provided, each imprinted with indicia 50 representing the thirty-six (36) possible outcomes of two (2) rolled dice (see FIG. 12). Therefore, whatever game of chance is being played with the illuminated card shuffler 10, the cards 18 include an indicia 50 suitable to decide the outcome of that game of chance. Each card 18 has a height and a width Y, wherein the height is greater than the width Y. See, for example, FIG. 8A which illustrates two cards 18 such as found in a standard deck of playing cards bearing indicia "A" (ace of spades) and "K" (king of hearts). The dimension X which, as described above, corresponds to the slot depth X of each card slot 16, may be shorter than the card width Y to such a degree that indicia 50 appearing on the side edge of each card 18 may be exposed above the front face 12 of the illuminated card shuffler 10 when the each card 18 is disposed in each card slot 16. Thus, the width Y of each card 18 is greater than the slot depth X of each card slot 16.

When the card 18 is disposed in the card slot 16, the extending loops or piles (for example) of the friction element 40 may be gently displaced so as to hold the card 18 centered and securely in the card slot 16. However, when the RNG 24 comes to indicate a particular card 18 (the winning card W) in the card slot 16, the dealer D can easily remove the winning card W using a light pull stroke with a thumb and forefinger of the dealer D. This allows the dealer D to announce the indicia 50 of the winning card W and thereby decide the game of chance (or at least a portion of the game of chance). Closed ends 46 of each card slot 16 positively restrain each card 18. An optional folder 48 may be used to at least partially conceal each of the indicia 50 of the cards 18 while the cards 18 are disposed in the card slots 16.

Figure 9:
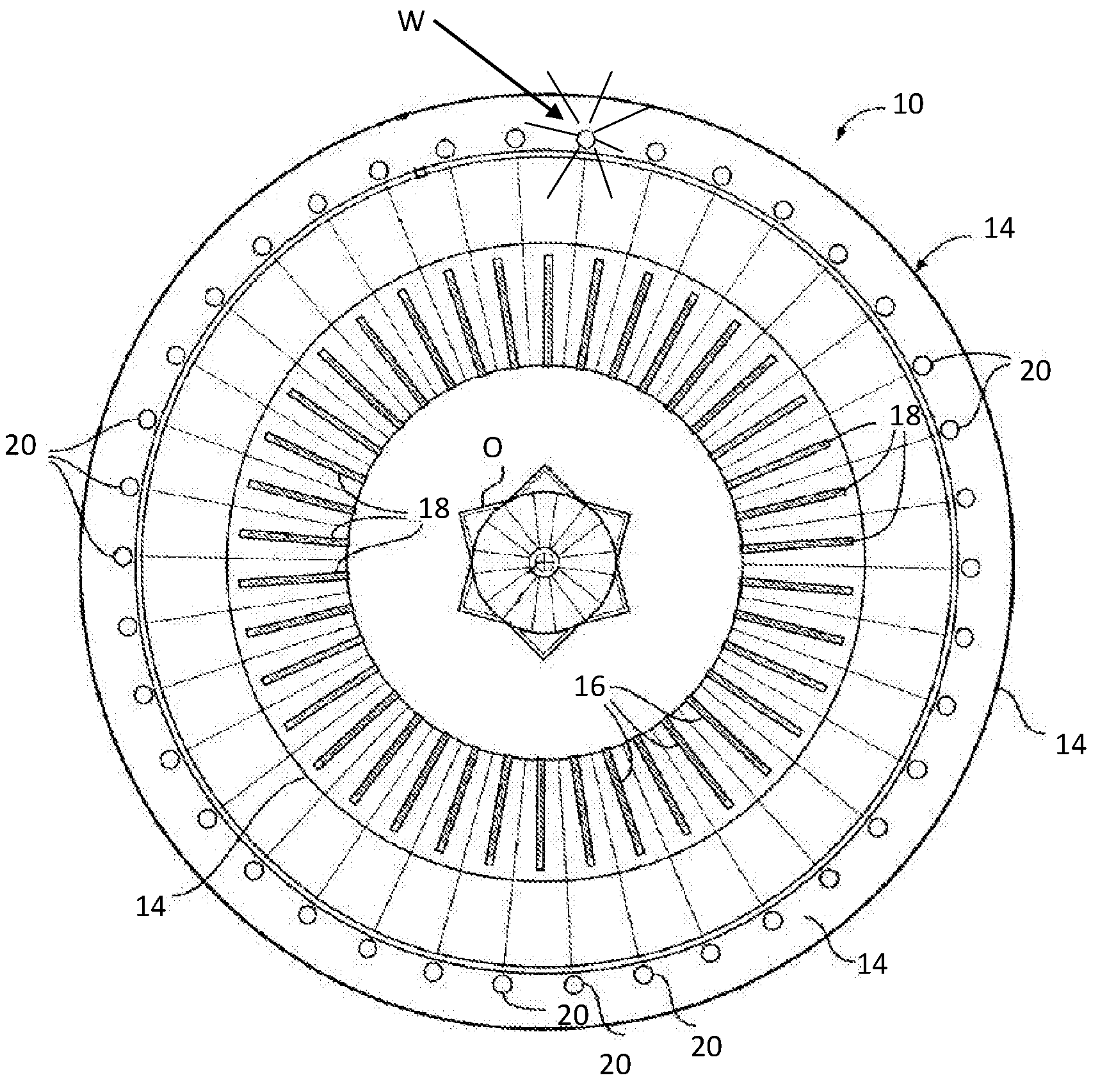
FIG. 9 is a top view of another embodiment of the illuminated outcome determination device, according to aspects of the disclosure.
Figure 10:
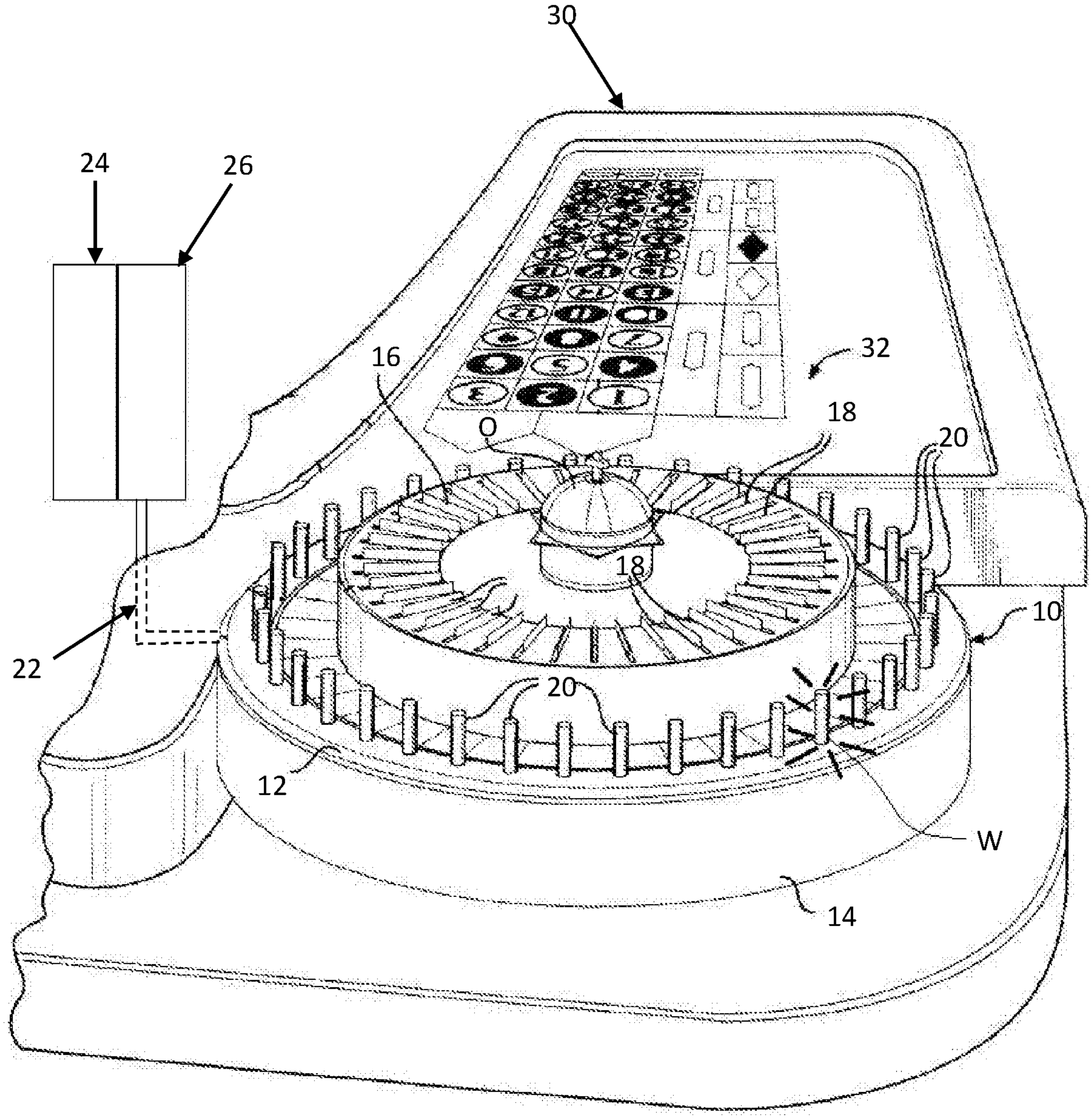
FIG. 10 is a perspective view of the illuminated outcome determination device shown in FIG. 9, wherein the illuminated outcome determination device is associated with the playing surface of a casino card game, according to aspects of the disclosure.
Figure 11:
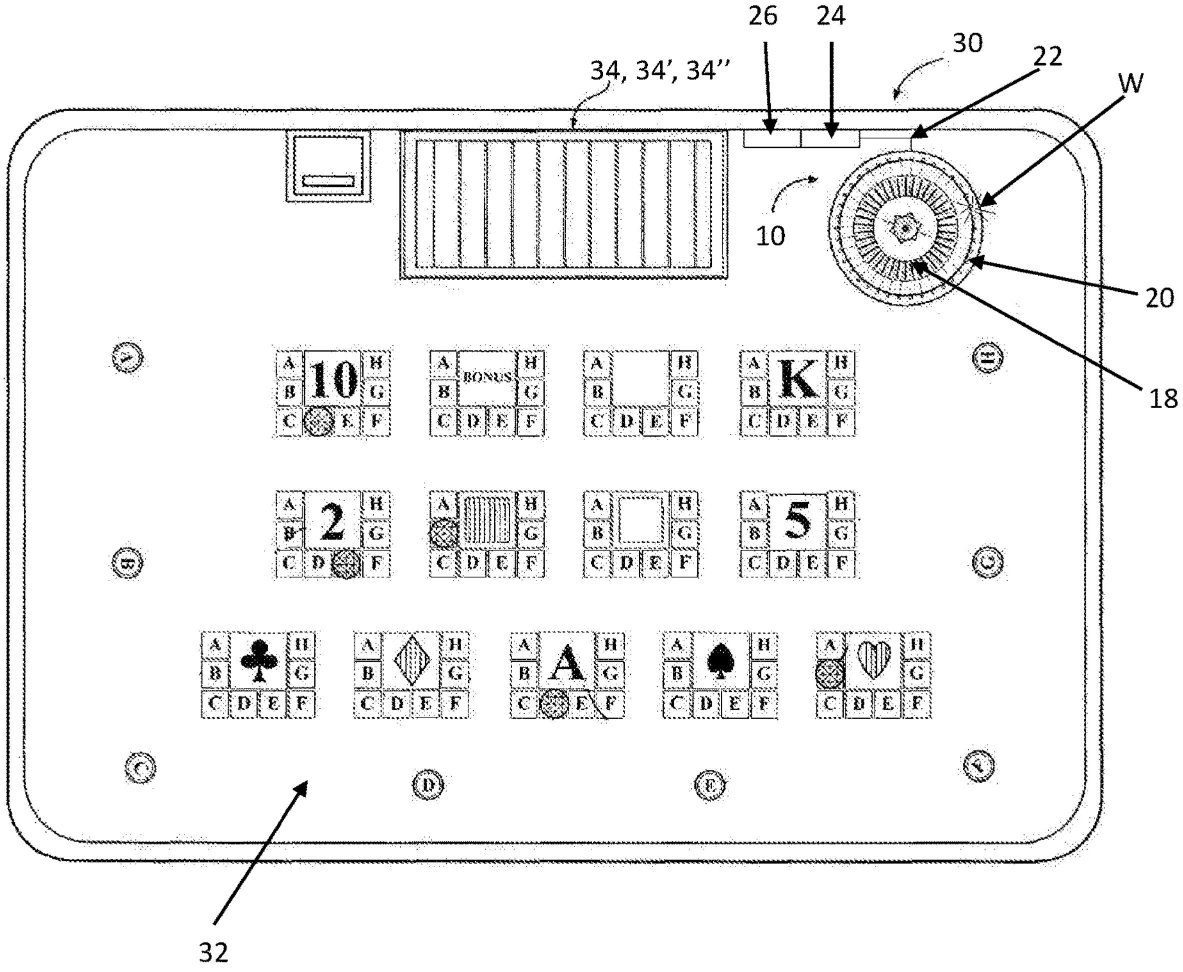
FIG. 11 is an exemplary playing surface layout for a physical table including the illuminated outcome determination device, according to aspects of the disclosure.

Referring now to FIGS. 9-11 another aspect of the disclosure is shown. The illuminated card shuffler 10 includes the front face 12, the back face 14, the plurality of card slots 16 to hold a plurality of cards 18, the plurality of lights 20 (including the light(s) 20 denoting the winning card W) and an ornament O disposed on the front face 12. The illuminated card shuffler 10 also includes the electrical connection 22 between the illuminated card shuffler 10, the RNG 24, and the controller 26. The illuminated card shuffler 10 may be disposed horizontally on the physical table 30 adjacent to or within the playing surface 32. The playing surface 32 may include the controller 26 for operation by the dealer D (not shown, see FIG. 3) and the chip tray 34.

FIG. 10 illustrates a side perspective view of the illuminated card shuffler 10 disposed horizontally on the physical table 30 next to the playing surface 32. Also shown in FIG. 8 is the electrical connection 22 between the illuminated card shuffler 10, the RNG 24 and the controller 26. It should be understood that the electrical connection 22, the RNG 24, and the controller 26 may be disposed within or near the physical table 30, and the aspect illustrated in FIG. 10 is merely exemplary and not limiting.

FIG. 11 illustrates an overhead (top) view of the illuminated card shuffler 10 disposed on the playing surface 32 of the physical table 30. The electrical connection 22 between the illuminated card shuffler 10, the RNG 24, and the controller 26 is shown on the playing surface 32 but may be disposed beneath the playing surface 32 of the physical table 30, with the electrical connection 22 passing through the playing surface 32 of the physical table 30 to the illuminated card shuffler 10. The electrical connection 22 may be configured as a wire, cable, or a set of wires and cables, for example. Additionally and alternatively, the electrical connection 22 may be a wireless connection, such as Wi-Fi or Bluetooth®.

Figure 12:
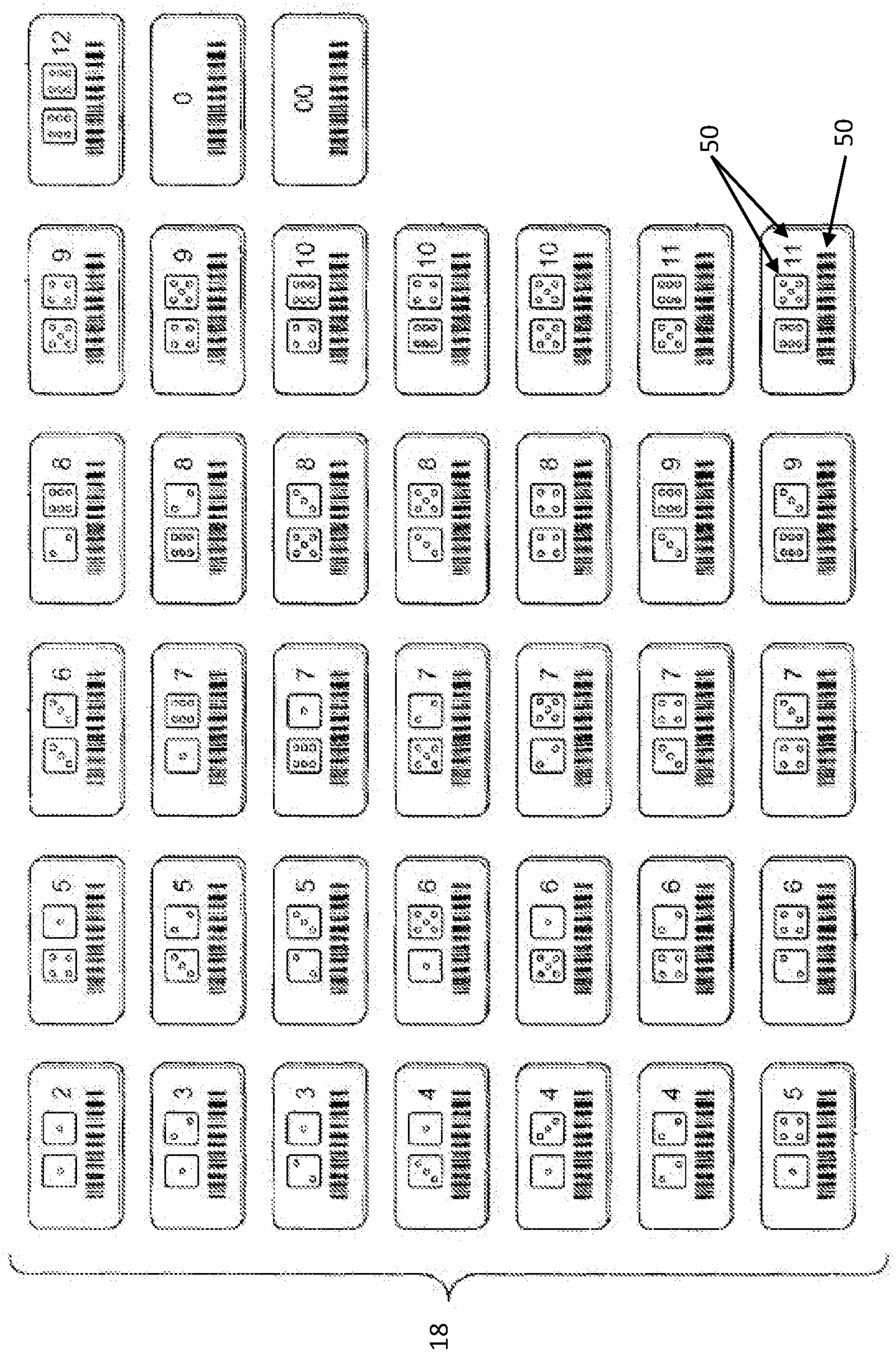
FIG. 12 is an exemplary view of 38 cards having indicia representative of two six-sided dice for playing a game according to traditional craps as may be used with the illuminated outcome determination device, according to aspects of the disclosure.
Figure 13:
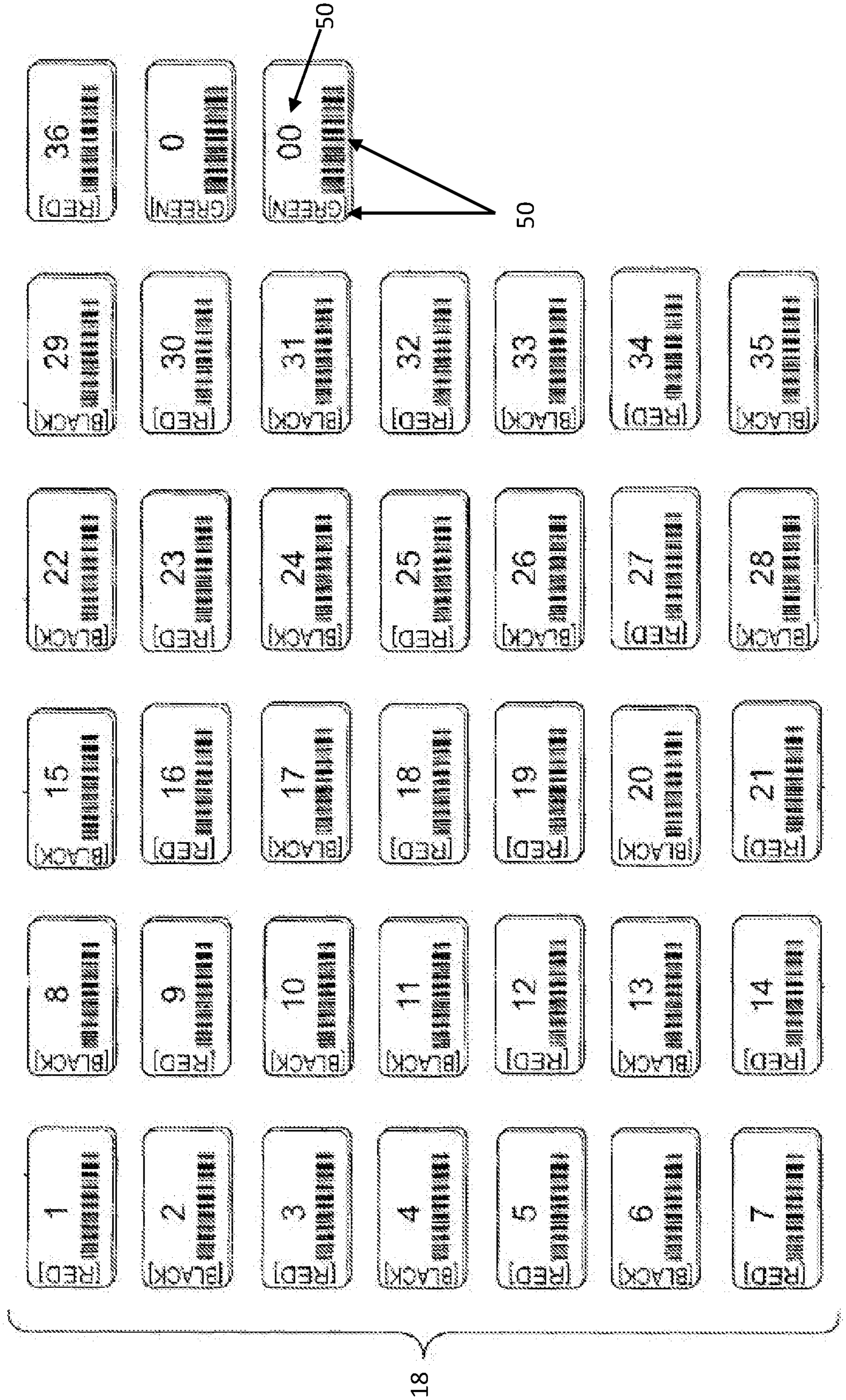
FIG. 13 is an exemplary view of 38 cards as may be used with the illuminated outcome determination device for playing conventional roulette, according to aspects of the disclosure.

Referring now to FIGS. 12 and 13, a plurality of cards 18 are shown. FIG. 12 illustrates an embodiment of the cards 18 that may be used with the illuminated card shuffler 10 for a dice game, such as craps. The cards 18 may include a plurality of indicia 50, such as but not limited to numbers, colors, text, symbols (characters, designs) and computer-readable label such as a bar code or QR-code. Additionally and alternatively, the cards 18 may include chips or other electronic devices implanted at least partially within the cards 18. In another aspect, the cards 18 may be configured as electronically-changeable media (video displays) such that the cards 18 may be changed according to the particular game being played on the illuminated card shuffler 10. FIG. 13 illustrates another aspect of the cards 18 that may be used with the illuminated card shuffler 10, such as for a game of roulette. The cards 18 include a plurality of indicia 50 that may include colors, symbols, and bar codes that may be used with a game of roulette using the illuminated card shuffler 10.

Various aspects of the above-described illuminated card shuffler 10 may be applied to the system 100 as well, and it will be appreciated that various ones of the specific aspects described in combination with the illuminated card shuffler 10 are applicable to the card 18 and slot 18 arrangement, but that the operational aspects of illuminating the winning card 18 are equally applicable to the illumination and determination of the sectors 114.

Both the system 100 and the illuminated card shuffler 10 have been described as having either a fixed outcome display (such as the wheel 102 that may not rotate), or a rotatable outcome display (such as the wheel 102 that may rotate). In some instances, for example when the card 18 is selected and retrieval of the card 18 from the slot 16 is necessary to view the outcome, it may be desirable to rotate the outcome display toward the dealer, because the dealer is typically located within a predetermined location separate from the players. Accordingly, the wheel 102 or other outcome display structure may be automatically rotatable via the controller 110 based on the determined outcome. If the winning sector 114 is a sector that is disposed away from the dealer location, a stepper motor (not shown) may be controlled by the controller 110 to rotate the wheel such that the winning sector 114 moves to the dealer location. Each rotation of the wheel 102 as determined by the controller 110 may be stored in memory, such that the controller 110 knows which sectors are disposed away from the dealer for each trial of the game. If the winning sector 114 is within a predetermined range of locations accessible to the dealer, the controller 110 may determine not to rotate the wheel 102. Alternatively, the controller 110 may be configured to rotate the wheel 102 after every trial, even if the winning sector 114 is within reach, such that only a small amount of rotation is used.

Due to the nature of determining the outcomes by the RNG 112 and the controller 110, the various outcomes that occur over the course of various trials may be automatically tracked and recorded by the controller 110. In one aspect, the outcomes of each trial may be posted, automatically or manually, to a tracking board, thereby displaying to players which outcomes have occurred over time. When each sector 114 has a known outcome or indicia assigned thereto, the outcome itself may be automatically posted to the tracking board. When the sectors 114 have indicia that may changes, such as through the use of cards 120 that may be removed and replaced, the identification of the sector may be automatically posted, rather than the game outcome. By tracking and posting the various outcomes, players may be able to have their wagers paid out at a later time, if proof of a wager for a particular trial is recorded. For example, a player may place a wager via an electronic input device, such as a mobile device or via a kiosk. Players may therefore participate remotely.

The foregoing disclosure has been described in accordance with the relevant legal standards, thus the description is exemplary rather than limiting in nature. Variations and modifications to the disclosed embodiment may become apparent to those skilled in the art and do come within the scope of the disclosure. Such variations are not to be regarded as a departure from the disclosure, and all such modifications are intended to be included within the scope of the disclosure. Those skilled in the art will recognize that concepts disclosed in association with an example enclosure assembly can likewise be implemented into many other systems to control one or more operations and/or functions. Accordingly, the scope of legal protection afforded this disclosure can only be determined by studying the following claims.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A system for determining and revealing an outcome of a game of chance, the system comprising:

a controller;

a random number generator (RNG) in communication with the controller, the RNG including a processor and a memory programmed and configured to produce an RNG outcome randomly, wherein the RNG outcome is one of a predetermined number of given outcomes, wherein each of the predetermined given outcomes operates to produce a gaming outcome that is one of a predetermined number of given gaming outcomes wherein each of the given gaming outcomes is a selectable outcome that is selectable via a wager operable to select the selectable outcome in the game of chance, wherein a payout results when the gaming outcome produced from the RNG outcome corresponds to the selectable outcome selected by the wager;

a display device including a plurality of sectors, wherein the sectors are configured to represent each of the predetermined number of given gaming outcomes, wherein each of the sectors includes a card or a plate identifying a specific gaming outcome;

a plurality of illumination devices associated with each of the plurality of sectors, such that each of the plurality of sectors represents one of the selectable outcomes and each of the plurality of sectors has a dedicated illumination device corresponding to the card or plate of the corresponding sector;

wherein each of the plurality of sectors indicates a specific selectable outcome when illuminated;

wherein, the RNG produces the RNG outcome randomly and the controller is configured to communicate with the plurality of illumination devices to illuminate an illumination device of the plurality of illumination devices that corresponds to a sector of the plurality of sectors that corresponds to the RNG outcome;

wherein the RNG and controller randomly causes illumination of a specific sector, and the specific card or plate at the illuminated sector produces the gaming outcome;

wherein the RNG outcome and the gaming outcome are different, wherein the RNG outcome is known to the controller and the gaming outcome is unknown to the controller based on a combination of the RNG outcome and the sector that is illuminated by the RNG outcome.

2. The system of claim 1, wherein the display device is a wheel.

3. The system of claim 2, wherein the wheel is fixed to a base and does not rotate.

4. The system of claim 2, wherein the wheel is fixed to a base and is rotatable relative to the base.

5. The system of claim 1, wherein the plurality of illumination devices are disposed below the plurality of sectors.

6. The system of claim 1, wherein the plurality of illumination devices are disposed adjacent the sectors.

7. The system of claim 1, wherein the plurality of sectors have indicia printed thereon.

8. The system of claim 7, wherein the indicia includes a number and a color.

9. The system of claim 7, wherein the indicia includes a representation of two dice.

10. The system of claim 1, wherein the sectors each include a removable indicia.

11. The system of claim 1, wherein the controller is configured to illuminate multiple ones of the sectors in a sequence prior to producing the outcome.

12. The system of claim 11, wherein the sequence is random.

13. The system of claim 11, wherein the sequence illuminates adjacent sectors in order to produce a rotating effect.

14. The system of claim 4, wherein the illumination devices are fixed to the wheel and rotate with the wheel.

15. The system of claim 1, wherein the gaming outcome is determined without a ball and without dice.

16. A system for determining and revealing an outcome of a game of chance, the system comprising:

a controller;

a random number generator (RNG) in communication with the controller, the RNG including a processor and memory programmed and configured to produce an RNG outcome randomly, wherein the RNG outcome is one of a predetermined number of given RNG outcomes;

a display device including a plurality of sectors, wherein the sectors are each associated with one of the predetermined number of given RNG outcomes and are configured to represent each of a predetermined number of potential winning outcomes;

a plurality of illumination devices associated with each of the plurality of sectors;

wherein the RNG produces the RNG outcome randomly and the controller is configured to communicate with the plurality of illumination devices to illuminate an illumination device of the plurality of illumination devices that corresponds to a sector of the plurality of sectors that corresponds to the produced RNG outcome thereby defining an illuminated sector;

wherein the RNG outcome determined by the RNG in combination with the illuminated sector defines an actual winning outcome from the plurality of potential winning outcomes based on which of the sectors is illuminated, wherein the actual winning outcome is an outcome upon which a payout is provided in response to a wager corresponding to the actual winning outcome; and wherein the actual winning outcome is unknown to the controller and only determinable based on which of the sectors is illuminated.

17. The system of claim 16, wherein the RNG outcome and the winning outcome is determined without a ball and without dice.

* * * * *